April 23, 1940.    W. A. REIN    2,198,126
EGG ASSORTING, CANDLING, AND PACKING DEVICE
Filed Jan. 16, 1939    2 Sheets-Sheet 2
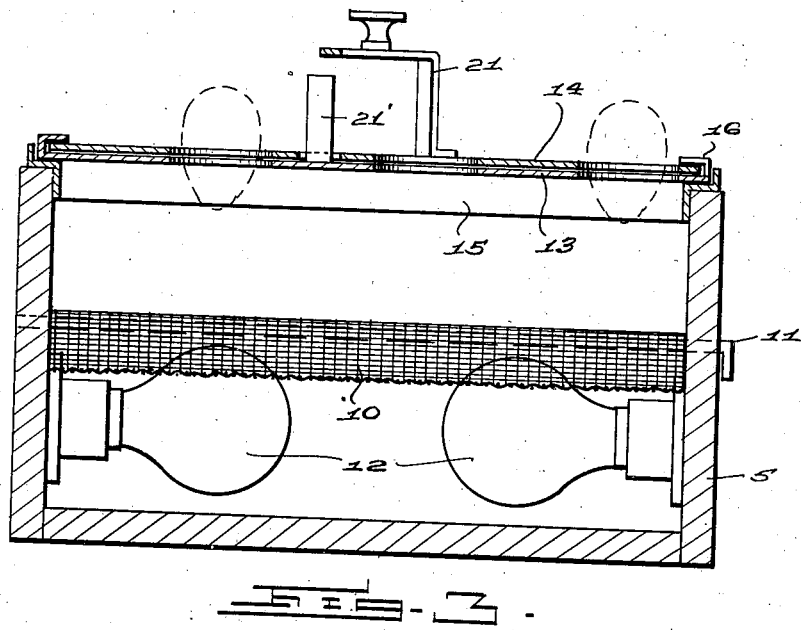
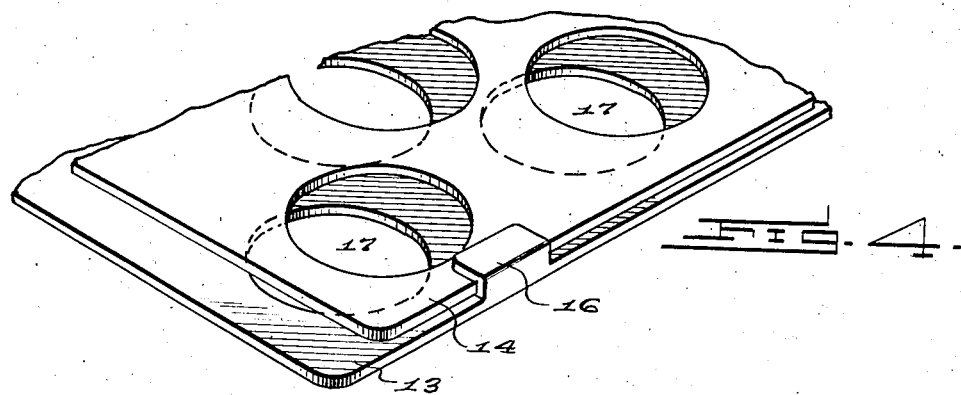
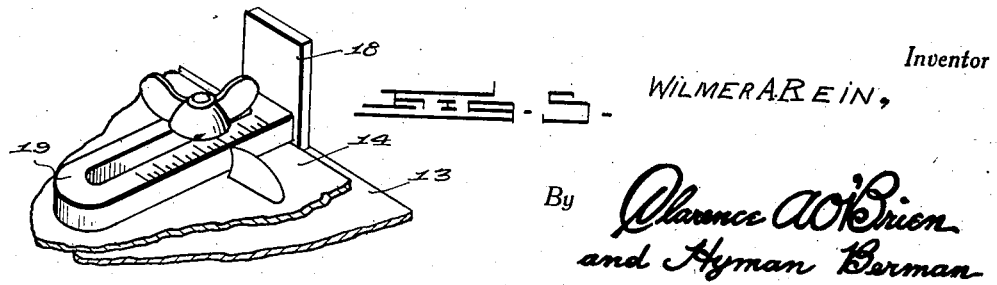
Inventor
WILMER A. REIN,

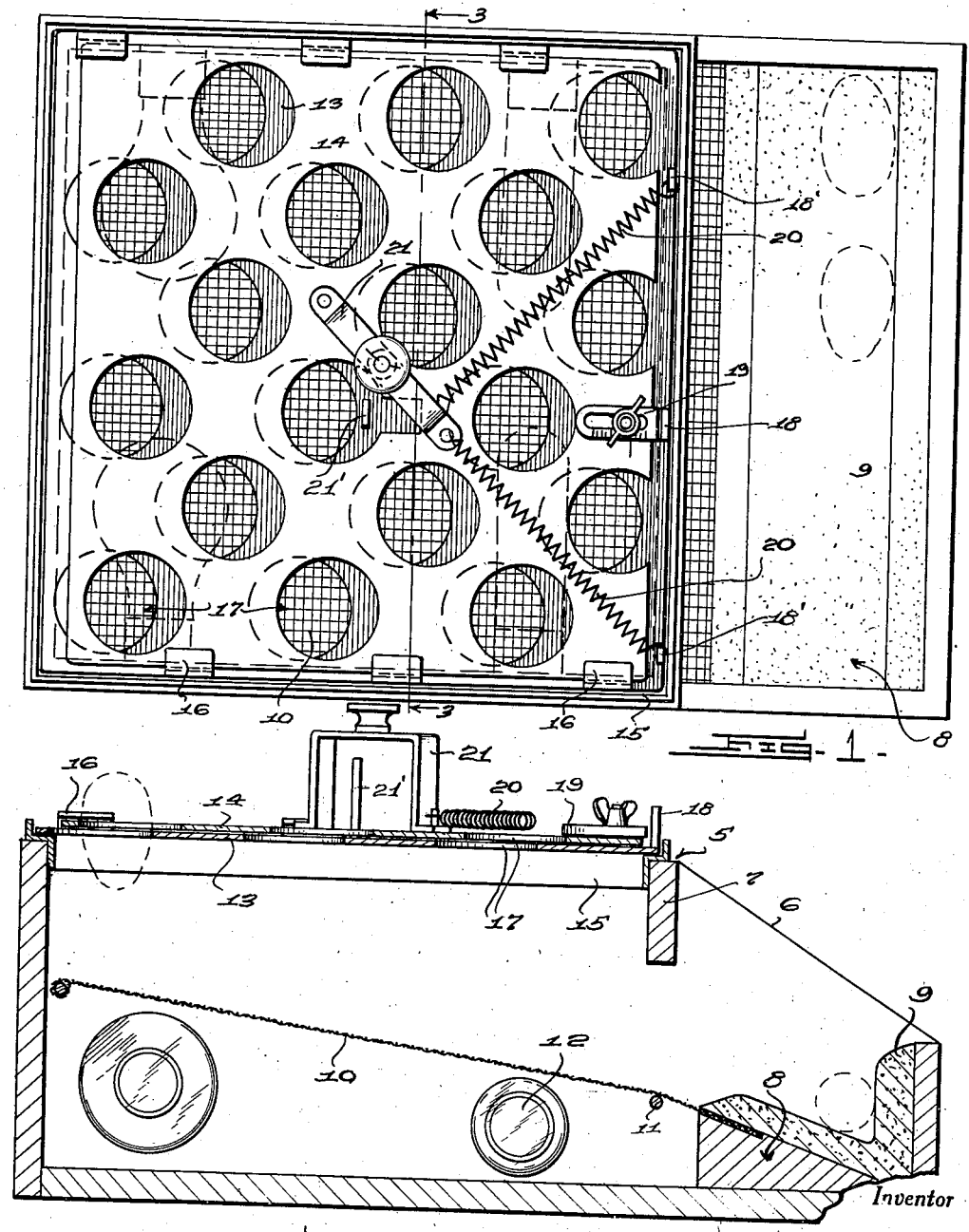

Patented Apr. 23, 1940

2,198,126

UNITED STATES PATENT OFFICE 2,198,126

EGG ASSORTING, CANDLING, AND PACKING DEVICE

Wilmer A. Rein, Stoughton, Wis.

Application January 16, 1939, Serial No. 251,279

3 Claims. (Cl. 209—85)

This invention relates to egg assorting, candling, and packing devices, and has for the primary object the provision of a device of this character which will permit a person to easily and quickly separate eggs smaller in size from eggs of a selective size and determine the internal condition of eggs of the selective size or larger and provide a very convenient means for placing of the latter-named eggs into an egg crate of the cell type and also permit convenient removal of the smaller eggs for inspection or candling and crating if desired.

With these and other objects in view, the invention consists in certain novel features of construction, combination and arrangement of parts to be hereinafter more fully described and claimed.

For a complete understanding of the invention, reference is to be had to the following description and accompanying drawings, in which Figure 1 is a top plan view illustrating an egg assorting, candling and packing device constructed in accordance with my invention.

Figure 2 is a vertical sectional view illustrating the device.

Figure 3 is a transverse sectional view taken on the line 3—3 of Figure 1.

Figure 4 is a fragmentary perspective view illustrating the egg assorting plate.

Figure 5 is a fragmentary perspective view illustrating the means of permitting adjustment of the plates relative to each other.

Referring in detail to the drawings, the numeral 5 indicates a casing or box fully open at the top thereof and one end wall of the casing is of a less height than the other end wall and portions of the side walls are cut away, as shown at 6. The cutaway portions of the side walls cooperate with the end wall of less height in defining a trough and partly separating said trough from the remaining portion of the box or casing is a partition 7 which acts as a brace between opposite side walls and defines an entrance between the trough and the other portion of the box or casing.

Mounted in the trough is a rack 8 covered with a cushion facing material 9, the cross sectional shape of which is substantially in the form of a V and leading from the rack 8 in an upwardly inclined direction is a sheet of foraminous material 10 supported by members 11 carried by opposite walls of the casing. The sheet of material 10 forms an inclined slide on which eggs may fall and be directed into the rack 8 coming to rest within the V thereof, as clearly shown in Figures 1 and 2. The sheet of material 10 being supported, as shown in Figure 2, will have a certain amount of give thereto so that when an egg drops thereon danger of the egg breaking will be eliminated still the egg will be caused to gravitate into the trough or rack due to the inclination of the sheet.

Electric illuminating lamps 12 are arranged under the sheet 10 and directly under the open portion of the casing and on which are mounted egg grading plates 13 and 14 arranged in superposed relation, the plate 13 seating within a frame 15 mounted on the box or casing, as clearly shown in Figure 2, and including upstanding flanges which will maintain the plate 13 in a fixed position. The plate 14 is slightly smaller than the plate 13 and is capable of being shifted relative thereto by sliding in opposite directions, being slidably secured on the plate 13 by clips 16 arranged at opposite edges thereof and formed on said plate 13.

The plates 13 and 14 each are provided with a selected number of openings 17 and which openings are adapted to coincide to variable extents so that eggs below a selected size will pass through said openings onto the sheet 10 for movement into the trough or rack while eggs of a larger size are supported by said plates.

An upstanding extension 18 is formed on the plate 13 and slidably secured on the plate 14 is a stop 19 having graduations thereon and which coacts with the extension 18 for variably limiting the sliding movement of the plate 14 relative to the plate 13 under the influence of springs 20 connected to lugs 18' on the plate 13 and to a combined bracket and handle 21 secured on the plate 14. The action of the springs is to move the plate 14 in a direction to decrease the amount the openings of said plates coincide, the movement of the plate 14 in this direction being limited by the stop 19 engaging the extension 18 and to vary the distance in which the plate 14 may move under the influence of the springs 20 the stop 19 may be adjusted on the plate 14. The adjustment of the stop 19 on the plate 14 may be easily carried out after the release thereof by the wing nut which normally secures the stop against adjustment.

In operation, the plates 13 and 14 are adjusted relative to each other so as to cause the openings thereof to form egg passages of a selected size. The operator then places the eggs in the openings of the plate 14 and the eggs which are of a smaller size than the diameter of the passages created by the positioning of the openings of the plates, 13 and 14, relative to each other slide through and drop on the apron 10 and roll therefrom into the trough 8 while the eggs of the selective size or larger remain in the openings of the plate 14. This is continued until all the openings of the plate 14 have eggs therein. By turning on the electric lamps the interior of the eggs supported by the plate then can be inspected and, of course, any eggs which are not in proper condition can be easily removed and the openings filled with other eggs. After all openings have been filled with eggs and the eggs inspected and passed inspection, the operator lifts the plates 13 and 14 off of the case by employing the handle 21 and positions said plates over the cells of an egg crate. The plates 13 and 14 are then moved relative to each other to permit the eggs to slide through into the cells. The movement of the plates 13 and 14 relative to each other against the action of the springs 20 may be brought about through moving the handle 21 and a projection 21' on the plate 13 away from each other.

It will be seen that the openings in the plates are so arranged that when they are positioned over the egg cells of a crate every other cell will be filled with an egg. The plates 13 and 14 are then returned to the case and the assorting and candling of the eggs is again carried out until all openings of the plate 14 are filled with eggs of a selected size or larger and the plates 13 and 14 are again removed from the case and given a one-quarter turn and positioned on the cells of the egg crate so that on the release of the eggs from the plates said eggs will fill the remaining cells of the egg crate.

The eggs which have collected in the rack 8 may be removed and by adjusting the plates 13 and 14 relative to each other to decrease the size of the egg passages said smaller eggs may be positioned in the openings of the plate 14 for candling purposes. The smaller eggs now in the openings of the plate 14 can be removed as heretofore described in connection with the eggs of the selective size or larger.

From the foregoing description taken in connection with the drawings it will be seen that the plates 13 and 14 are provided with eighteen openings, which is one-half the number of cells to a conventional type of egg crate. Thus through two operations of candling and selecting the eggs and the placing of the plates in the egg case all cells thereof will be filled with eggs without danger of breaking of any of the eggs.

This invention will grade eggs not only to size but as to weight which is very important in the egg industry.

It is believed that the foregoing description, when taken in connection with the drawings will fully set forth the construction and advantages of this invention to those skilled in the art to which such device relates, so that further detailed description will not be required.

Having thus described the invention, what I claim is:

1. In a device of the character set forth, a casing including a trough, a foraminous inclined apron arranged in the casing and connected with the trough and inclining toward the latter, a plate mounted on said casing against sliding movement, a second plate slidably mounted on the first plate, stop means carried by the first plate for limiting the movement of the second plate relative to the first plate, openings formed in said plates and movable into substantial registration on the movement of the second plate manually relative to the first plate, spring means acting on the second plate to normally position the same to move the openings thereof substantially out of alignment with the openings of the first plate, and adjustable stop means carried by the second plate for coaction with the stop means whereby the movement of the second plate relative to the first plate under the influence of the spring means may be varied.

2. An egg assorting device comprising slidably connected superimposed arranged plates provided with openings coacting to define egg passages of a selected diameter whereby eggs placed in the openings of one of the plates and smaller than the diameter of said passages may pass through said passages and the eggs of the selective size and of larger size remain supported by the uppermost plate, means for supporting said plates and having the plate removable therefrom to permit carrying of the eggs on the uppermost plate to a crate, spring means tending to urge one of the plates in one direction, adjustable means for limiting the sliding movement of the plates relative to each other in one direction, and means whereby the plates may be slid relative to each other in an opposite direction manually to free the eggs and for deposit into the crate.

3. An egg assorting device comprising slidably connected plates arranged in superimposed relation and provided with a selective number of openings coacting to define egg passages of a selected diameter whereby eggs placed in the openings of the uppermost plate and of a smaller size than the diameter of the egg passages may pass through said plates and the eggs of the selective size or of a larger size remaining supported by the openings of the uppermost plate, a handle on the uppermost plate, an extension on the lowermost plate and extending through one of the openings of the uppermost plate, a fixed stop on the lowermost plate, an adjustable stop on the uppermost plate coacting with the fixed stop for limiting the sliding movement of one of the plates relative to the other plate in one direction, spring means connected to one of the plates and to the handle for urging the plates relative to each other in the last-named direction, said handle and extension being employed for moving the plates manually in an opposite direction to free the eggs carried thereby, the number of openings in said plates being one-half of the cells in an egg crate and the arrangement thereof permitting on the release of the eggs into the cells to fill every cell of the crate, the remaining cells being filled on a repeated operation and by changing position of the plates in the crate.

WILMER A. REIN.